United States Patent [19]

Dehlén

[11] Patent Number: 4,733,992

[45] Date of Patent: Mar. 29, 1988

[54] FENDER

[75] Inventor: Bengt Dehlén, Trelleborg, Sweden

[73] Assignee: Trelleborg AB, Trelleborg, Sweden

[21] Appl. No.: 925,636

[22] PCT Filed: Mar. 3, 1986

[86] PCT No.: PCT/SE86/00087

§ 371 Date: Oct. 7, 1986

§ 102(e) Date: Oct. 7, 1986

[87] PCT Pub. No.: WO86/05828

PCT Pub. Date: Oct. 9, 1986

[30] Foreign Application Priority Data

Mar. 29, 1985 [SE] Sweden ............................ 8501567

[51] Int. Cl.⁴ .......................................... E02B 3/22
[52] U.S. Cl. .................................. 405/215; 267/140
[58] Field of Search .............. 405/212, 215; 114/219; 267/139, 140, 141

[56] References Cited

U.S. PATENT DOCUMENTS 3,820,495  6/1974  Ueda ........................... 405/215 X
4,285,616  8/1981  Evetts ........................... 405/215

FOREIGN PATENT DOCUMENTS 189403  11/1983  Japan ............................ 405/212
166998  5/1981  Netherlands ................. 405/215

Primary Examiner—David H. Corbin
Attorney, Agent, or Firm—Beveridge, DeGrandi & Weilacher

[57] ABSTRACT

A fender (10) which is essentially U-shaped in cross section and which consists of elastomer material in its energy-absorbing part, is manufactured in planar configuration and folded to U-sectional shape on mounting. To make folding possible and to provide both an equalisation of tensile stresses and an increase of the transfer of forces between the web (12) and the legs (13) of the U-shaped cross section, longitudinal slots (17) are formed on the inside of the U-shaped cross section at the transition between the web and the legs. The mouth edges of the slot are bevelled and form mutually abutting supporting surfaces (18) for said transfer of forces. At the bottom of the slot (19), a longitudinal open channel (21) has been left to equalize the tensile stress occurring in the fender material on folding.

15 Claims, 4 Drawing Figures

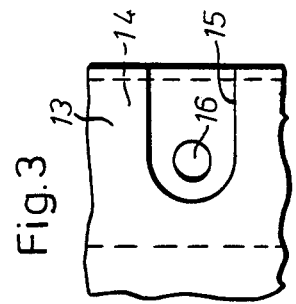
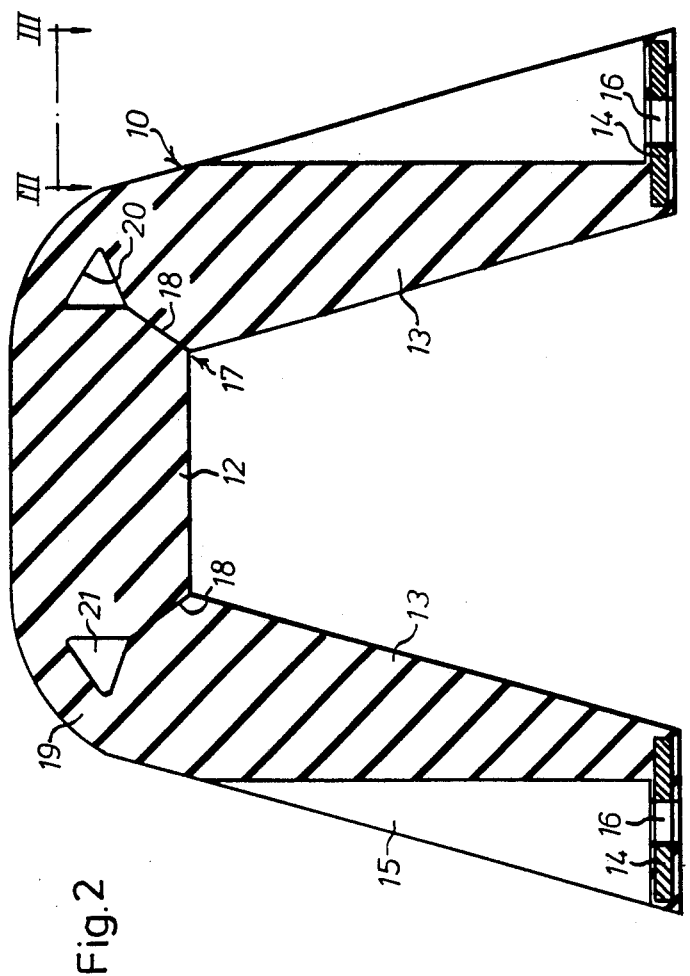
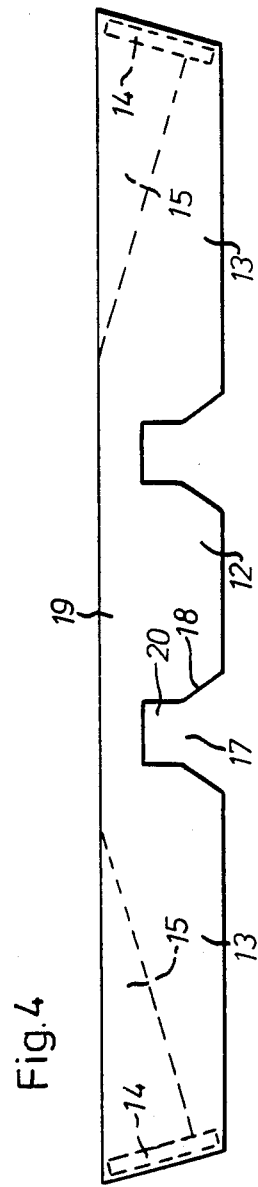

FENDER

The present invention relates to a fender adapted to be mounted on a quay to absorb the shocks of a vessel making fast at quayside. Such fenders frequently are elongate and have an arched cross section, i.e. the fenders have an essentially U-shaped cross section in the mounted state, the legs of said U-shaped cross section having attachments for anchoring to a base. Together with the web of said U-shaped cross section, the legs constitute the shock-absorbing part of the fender, a part which usually is made of elastomer material. In the past, fender design has been highly diversified. In many cases, the fenders have been manufactured with a shock-absorbing part in the form of a closed profile, as will be seen from U.S. patent specification Nos. 2,935,855, 3,418,815, 3,443,351, 3,507,123, 3,563,525, 3,680,851 and 3,690,280. However, production difficulties are encountered in making the shock-absorbing part in the form of a closed or hose-shaped profile, and it has therefore also been suggested that the fenders be manufactured in the form of loose parts that are put together. Examples of such constructions are disclosed by U.S. patent specification Nos. 3,533,242 and 3,788,082. Although the production of such fenders is simplified, assembly is more difficult in that a number of loose parts must be put together.

U.S. patent specification No. 3,508,744 discloses another type of the arched fender in which the U-shaped cross section is made in one piece. The legs of this fender are of different thickness in that they have a relatively thick portion adjacent the web and a relatively thin portion adjacent the mounting end, and on the inside of the U-shaped cross section a buckling indication is provided at the boundary between the thick and the thin portion. A fender of this design functions satisfactorily but suffers from the considerable disadvantage that it must be manufactured in special moulds which are expensive.

The basic concept of the present invention is different in that it proposes a fender to be manufactured in planar configuration and to be folded to U-shaped cross section on mounting. Like prior art fenders, the fender according to the present invention comprises a shock-absorbing part made of elastomer material and having an essentially U-shaped cross section in the mounted state. However, the fender according to the invention is manufactured in planar configuration and folded into U-shaped cross section on mounting. To make folding possible and to provide both an equalisation of tensile stresses and an increase of the transfer of forces between the webs and the legs of the U-shaped cross section, longitudinal slots are formed on the inside of said U-shaped cross section at the transition between the web and the legs. To provide for said transfer of forces, the mouth edges of the slot have been formed with supporting surfaces which are brought into contact with one another when the fender is mounted. To this end, the mouth edges of the slot may be bevelled to form said supporting surfaces. The slot preferably has such a depth that a longitudinal open channel is left at the bottom of the slot after the supporting surfaces have been brought into contact with one another. Such a longitudinal slot provides for better equalization of the tensile stresses occurring in the fender material on folding.

The use of fold lines to enable mounting of shock-absorbing elements along curved surfaces is previously known from U.S. patent specification No. 3,684,272. In this prior art fender or shock-absorber, the fold lines extend transversely of an elongate parallelepipedal body which is bent across a curved surface and attached thereto by means of protruding fastening means. This U.S. patent specification therefore does not disclose the same technical concept as the present invention.

The characteristic features of the fender according to the present invention are stated in the main claim, the subclaims defining especially preferred embodiments of the fender according to the invention.

An embodiment of the fender according to the invention will be described below in more detail, reference being had to the accompanying drawings in which FIG. 1 is a perspective view showing how a fender according to the invention may be mounted to a quayside;

FIG. 2 is a cross-sectional view of one of the fenders shown in FIG. 1, said cross-sectional view having been taken centrally through the fender attachments;

FIG. 3 is a view on line III—III in FIG. 2; and

FIG. 4 is an end view of the fender before mounting.

Figure 1:
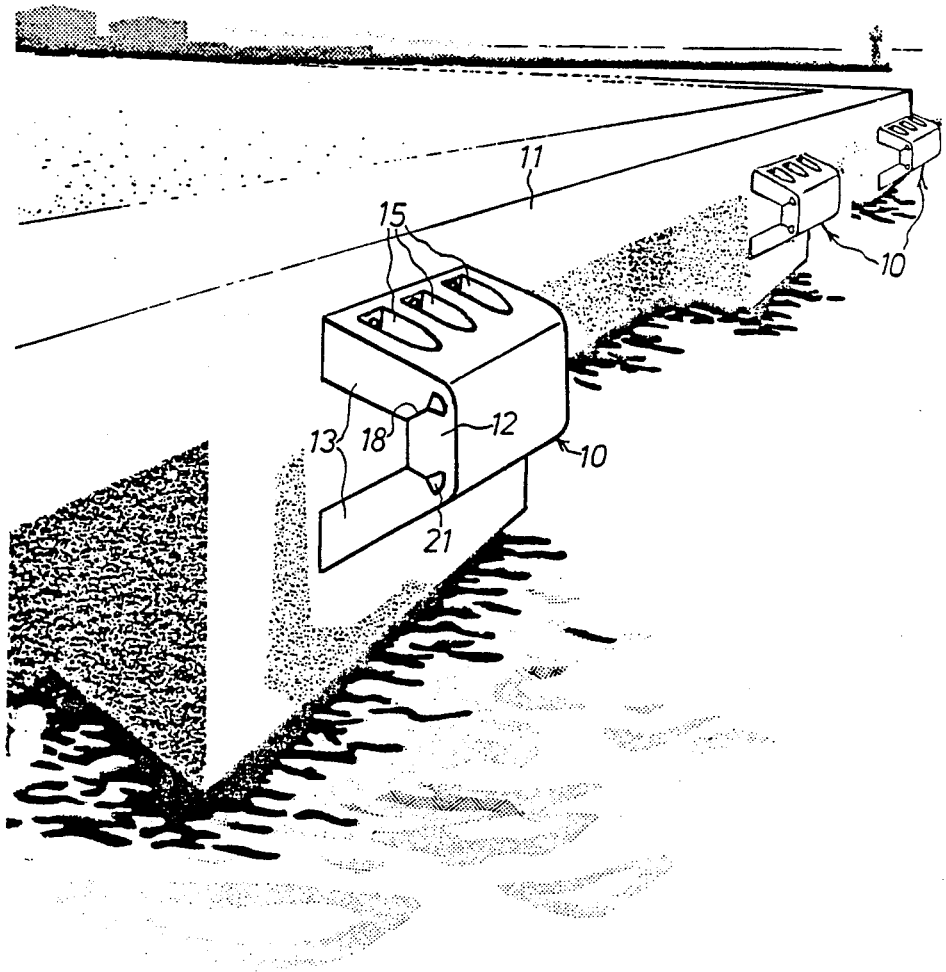

FIG. 1 shows a number of fenders 10 mounted to a quayside 11. When mounted, each fender has an essentially U-shaped cross section comprising a web 12 and legs 13, said legs thus accounting for the major part of the energy-absorbing capacity of the fender.

Reinforcing plates 14 are vulcanized into the free ends of the legs 13. These plates may consist of some suitable metallic material, such as steel, while the remainder of the fender is made of an elastomer material suitable for the purpose of the invention. To facilitate mounting of the fender, a number of recesses 15 are formed in the outer side of the legs 13, and a mounting hole 16 extends through the bottom end and the reinforcing plates at the end of the recesses 15.

According to the invention, there are provided, between the web 12 and the legs 13 of the fender, longitudinal slots 17 which are closed in the mounted fender, such that parts of the opposing mouth edges of said slots form mutually abutting supporting surfaces 18. It is possible to manufacture the fender according to the invention in planar configuration, as shown in FIG. 4, said supporting surfaces being bevelled at the mouth end of the slots. The slots 17 extend deep down into the wall material of the fender, while leaving a wall material piece 19 which forms a corner and connection spring between the fender web and legs. The bottom end 20 of the slot extends so far into the wall material of the fender that it forms, in the mounted fender, a through channel 21 adjacent the corner piece 19.

Since the slots 17 have been formed such that their mouth edges form mutually abutting supporting surfaces 18, the corner pieces 19 will not be subjected to excessive elongation or tensile loads during mounting of the fender. An excessive tensile load at the corner pieces could damage the fenders. The through channels 21 provide for further equalization of the tensile loads in the corner pieces 19, and the bevelled supporting surfaces 18 provide for load transfer between the legs 13 and the web 12 when the fender is subjected to oblique impacts.

The resiliency of the fender design according to the present invention may be varied by changing the thickness of the corner pieces 19. Also the length of the legs 13 has an effect upon the energy-absorbing capacity of the fender. By changing the distance between the reinforcing plate vulcanized into the free ends of the legs and the fold line represented by the slot 17, the energy-absorbing capacity of the fender may thus be altered.

Since the fender according to the present invention can be manufactured in planar configuration, the tool expenditure will be lower and the vulcanization equipment can be simplified considerably. Thus, changing the energy-absorbing capacity by changing the length of the legs 13 is readily accomplished by moving the mould end walls farther away from the mould center where the slots 17 are to be formed. If one has access to large vulcanization presses, the fender elements can be manufactured in great lengths which are then cut to the required dimension upon delivery. Furthermore, since the fender can be transported in planar configuration, shipping will be both simpler and cheaper.

In the embodiment illustrated, the slots 17 have been given a depth corresponding to about two thirds of the wall thickness of the fender, whereby the supporting surfaces 18 are caused to extend along about one third of the fender thickness. This dimensioning has proved especially advantageous, but other fashionings are conceivable, for instance if one wishes to change the resiliency of the structure, in which case the corner piece 19 can be made thinner.

I claim:

1. A fender which is elongate and, in the mounted state, has an essentially U-shaped cross section, the legs (13) of said U-shaped cross section having attachments (14, 16) for anchoring to a base (11) and forming, together with the web (12) of said U-shaped cross-section, the energy-absorbing fender part which consists of elastomer material, characterized by a longitudinal slot (17) serving as a fold line and reducing elongation stress, said slot being formed on the inside of said U-shaped cross section between the web (12) and legs (13) thereof and having, adjacent said inside, opposing supporting surfaces (18) and, further, having a width and shape such that said slot, when the fender is folded to U-shaped cross section during mounting of the fender, is closed so that said supporting surfaces (18) will mutually abut.

2. A fender as claimed in claim 1, characterised in that the slot (17) serving as fold line as such a depth and is designed such that an open longitudinal channel (21) remains between the slot bottom (19) and the supporting surfaces (18) after the fender has been mounted.

3. A fender as claimed in claim 2, characterized in that said longitudinal slot (17) has a mouth with edges which are believed to form said supporting surfaces (18)

4. A fender as claimed in claim 3, characterized in that the depth of the said slot (17) amounts to approximately two thirds of the fender wall thickness, and that said supporting surfaces (18) extend along about one third of the fender wall thickness.

5. A fender as claimed in claim 1, characterized in that said longitudinal slot has a mouth with edges which are bevelled to form said supporting surfaces.

6. A fender as claimed in claim 5, characterized in that the depth of the said slot amounts to approximately two thirds of the fender wall thickness, and that said supporting surfaces extend along about one third of the fender wall thickness.

7. A fender as claimed in claim 1, characterized in that the depth of the said slot amounts to approximately two thirds of the fender wall thickness, and that said supporting surfaces extend along about one third of the fender wall thickness.

8. A fender as claimed in claim 7, characterized in that the slot serving as fold line has such a depth and is designed such that an open longitudinal channel remains between the slot bottom and the supporting surfaces after the fender has been mounted.

9. A fender, comprising, an elongated body of elastomeric material which is deformable from an initial form which has relatively flat cross section to a final installed form which has generally U-shaped cross section with a web and two legs, said fender including a longitudinal slot which provides a fold line and is located between a web and a leg, a pair of supporting surfaces which are at opposite sides of said longitudinal slot and are located so as to move from initial positions which are spaced apart to final positions which are mutually abutting when the fender is folded from its initial form to its final form.

10. A fender according to claim 9 wherein the slot has a bottom, said fender having a longitudinal open-ended channel which lies between the supporting surfaces and the bottom of the slot when the fender is in said final form.

11. A fender according to claim 9 wherein the supporting surfaces are bevelled surfaces at the edges of said slot.

12. A fender according to claim 11 wherein the slot has a depth which is approximately two thirds the thickness of the fender in its initial form, said supporting surfaces occupying about one third of the thickness of the fender in its initial form.

13. A fender according to claim 9 having two said slots associated with two pair of said supporting surfaces.

14. A fender according to claim 13 wherein the slot has a bottom, said fender having a longitudinal open-ended channel which lies between the supporting surfaces and the bottom of the slot when the fender is in said final form.

15. A fender according to claim 14 wherein the supporting surfaces are bevelled surfaces at the edges of said slot.

* * * * *